US005791672A

United States Patent [19]

Masclet

[11] Patent Number: 5,791,672

[45] Date of Patent: Aug. 11, 1998

[54] SET OF QUICK RELEASE HUBS FOR WHEELCHAIRS FOR PHYSICALLY HANDICAPPED PERSONS WITH HEMIPLEGIC DISABILITY

[76] Inventor: Claude Masclet, Le Chatelard, 42210 Marclopt, France

[21] Appl. No.: 615,862

[22] Filed: Mar. 13, 1996

[30] Foreign Application Priority Data

Mar. 13, 1995 [FR] France .................................. 95 03091

[51] Int. Cl.$^6$ .................................................... B62M 1/14

[52] U.S. Cl. .................................... 280/250.1; 280/304.1; 280/650; 301/124.2

[58] Field of Search ............................ 280/250.1, 304.1, 280/242.1, 650; 301/110.5, 111, 124.2, 115, 120, 125; 297/DIG. 4

[56] References Cited

U.S. PATENT DOCUMENTS 4,506,900 3/1985 Korosue .............................. 280/250.1
4,766,772 8/1988 Tsuchie .............................. 280/255 X
5,161,630 11/1992 Garin, III et al. .............. 280/250.1 X
5,482,305 1/1996 Jeffries et al. ....................... 280/250.1
5,549,315 8/1996 Ashman ................................ 280/279

*Primary Examiner*—Brian L. Johnson
*Assistant Examiner*—Avraham Lerner
*Attorney, Agent, or Firm*—Gerald E. Linden

[57] ABSTRACT

A set of quick release hubs for wheelchairs for physically handicapped persons with hemiplegic disability, characterized by two identical inserts (D1 & D2) located inwards from the hubs (M1 & M2) having quick release, being securely fastened into supports (10) provided on the wheelchair frame for the wheel location, each insert (D1 & D2) being coupled to each other on the inwards sides by an adjustable linkage system (1) and fitted on the other sides against the hub (M1 & M2) of the wheels (R1 & R2) of the wheelchair, one (D1) of the inserts including a drive collar and hand rim (18) for the handicapped person, thereby forming a drive system while the other insert (D2) being a driven system; the other rotation being provided directly on the outer hand rim (23) connected to the wheel (R1) thus placing the controls of the wheelchair motion on one side.

6 Claims, 4 Drawing Sheets

SET OF QUICK RELEASE HUBS FOR WHEELCHAIRS FOR PHYSICALLY HANDICAPPED PERSONS WITH HEMIPLEGIC DISABILITY

TECHNICAL FIELD OF THE INVENTION

The invention relates to wheelchairs and, more specifically, to sets of hubs that permit physically handicapped persons with hemiplegic disability to operate the wheelchair from either side.

BACKGROUND OF THE INVENTION

Due to their disability, handicapped persons with hemiplegic disability do not have the ability and the possibility to operate at the same time, both right and left sides, with their hands and arms the handles or rims provided on the wheels of the wheelchairs. It is thus necessary and known to provide sets of hubs that allow the user to operate the wheelchair from either side, from the right or left wheel. The two hubs or the set of hubs are connected together by a linking means of expandable bars or other such linkage located between the hubs.

The inventor has manufactured, for many years, this type of hub, and FIG. 1 represents such a product. These hubs require rather complex machining, and are therefore expensive. They suffer other disadvantages, including sizeable weight and permanent positioning on the wheelchair.

Subsequently and in his quest for new products the inventor has designed recently a new quick release axle for wheelchair described in the french patent application no. 94.12027. Such an axle is intended to be used by other than hemiplegic wheelchair users, as it can be activated on the right and left wheels.

Briefly, the quick release axle described in the above mentioned french patent application no 94.12027 includes a hub body with internal ball bearings which allows the positioning and the guiding of the hub axle. This axle is slip-fitted into a receiver attached on the frame of the wheelchair. The axle is maintained in a desired location by a mechanism which expands radially when activated by a lever placed at the end of the axle. When the lock position of the lever is attained the axle is securely fastened inside of the receiver.

BRIEF DESCRIPTION (SUMMARY) OF THE INVENTION

Several variations of designs and concepts of this principle are described and depicted in this patent application. This hub as described is very reliable and it allows quick and easy removal or installation of the wheel from or to the wheelchair.

In view of the above, the inventor has looked into adapting the quick release axle feature to wheelchairs designed for physically handicapped persons with hemiplegic disability.

The purpose of the invention was to look into and search technical solutions that would provide an answer to the needs of the recipients in terms of right or left installation of the wheels according to the need of the user and without modifications to the wheelchair.

Another goal was to standardize somehow the manufacturing of these hubs in reducing significantly the number of parts constituting a set.

These goals and others will be described later on.

As a first characteristic, the set of quick release hubs for wheelchairs designed for physically handicapped persons with hemiplegic disability, is remarkable by the fact that it has two identical systems positioned inward from the hub with the quick release axle, being an integral part of the wheels' supports onto the wheelchair frame. Each system is linked by a system of adjustable bars, which are in the form of parallelograms, in order to accommodate different wheelchair widths and the folding of the wheelchair when necessary, for storage or for any other reason. One of the systems, called the drive side system, incorporates by its design a means to enable the user to control the movement of the wheelchair from the drive side while the other system associated with the other hub is the driven or idle side system. This is achieved by the use of two separate handrims located on the drive side system.

According to the invention, a wheelchair having a frame, a first wheel and a second wheel, is provided with at least one quick-release mechanism associated with at least a one of the first and second wheels. Each of said at least one quick-release mechanism comprises:

an insert fixed to the frame and having a bore;

an axle having an expandable collar at one end;

means, disposed at the other end of the axle, for selectively allowing a user to expand the collar into engagement with the insert and to contract the collar from engagement with the insert.

According to a feature of the invention, a quick-release mechanism is associated with each one of the first and second wheels.

According to a feature of the invention, a mechanism is disposed on only one of the first and second wheels, for permitting the user to drive either one of the first and second wheels.

In this manner, a user may mount the wheel which has the mechanism for driving both wheels on either side of the wheelchair.

These characteristics and others will be described hereinbelow.

Other objects, features and advantages of the invention will become apparent in light of the following description thereof.

BRIEF DESCRIPTION OF THE DRAWINGS

The invention is depicted in the following drawings but is not limited to those drawings.

Figure 1:
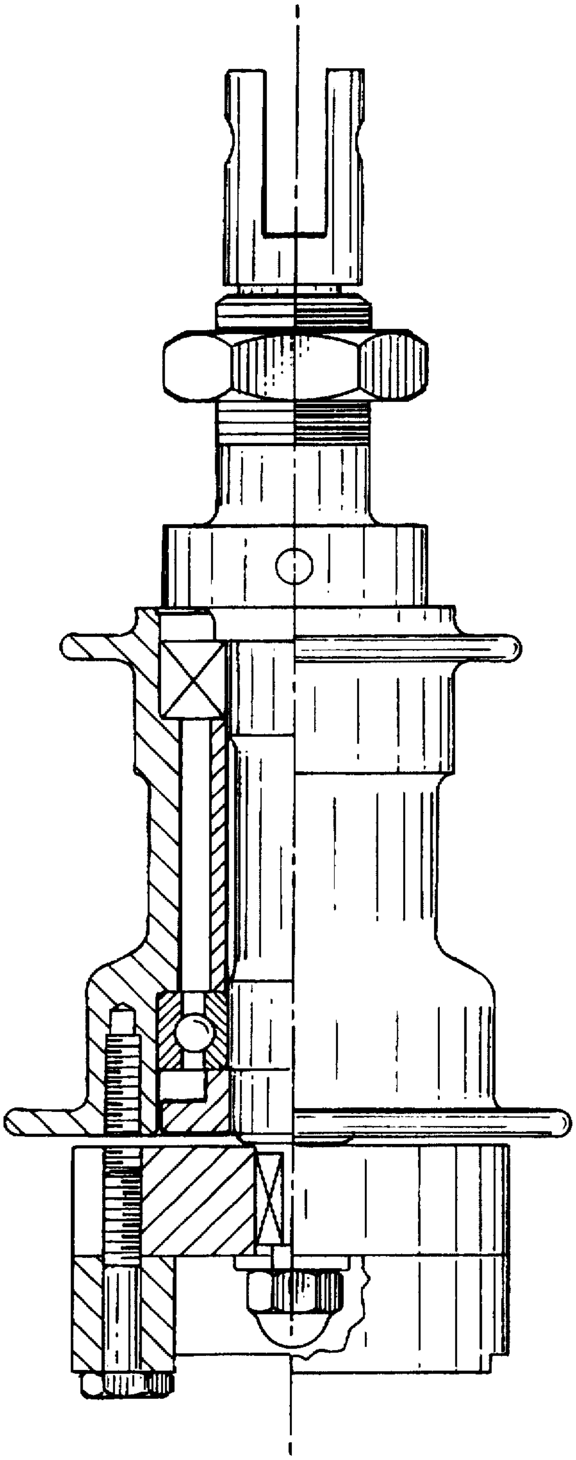
FIG. 1 PRIOR ART
FIG. 1 is a drawing of the hub of a prior art design for this application, one hub of this type was installed on each wheel.
Figure 2:
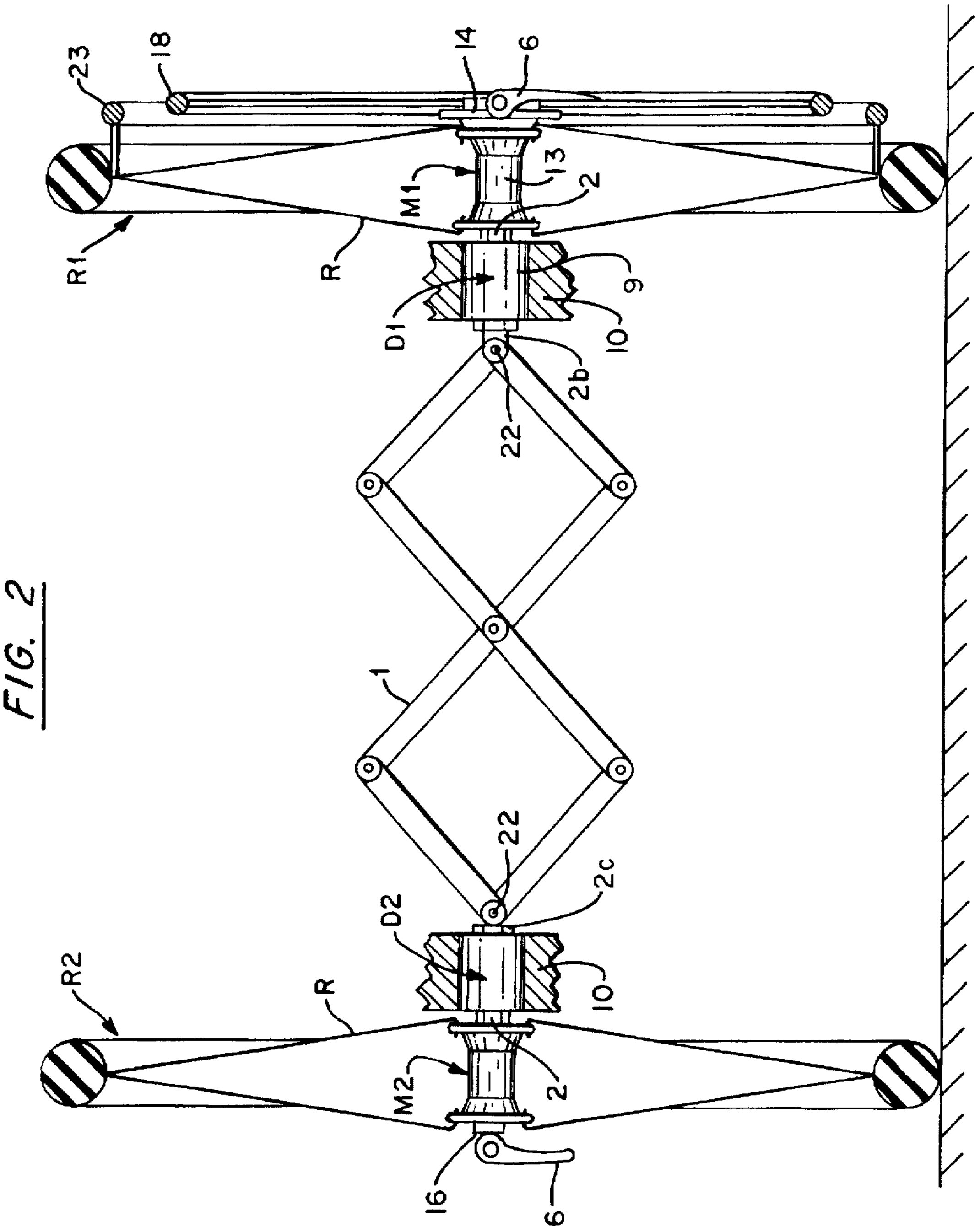
FIG. 2 is an illustration of an embodiment of a set of hubs with one type of quick release axle (lever type) and one type of linkage between hubs (articulated bars), according to the invention.
Figure 3:
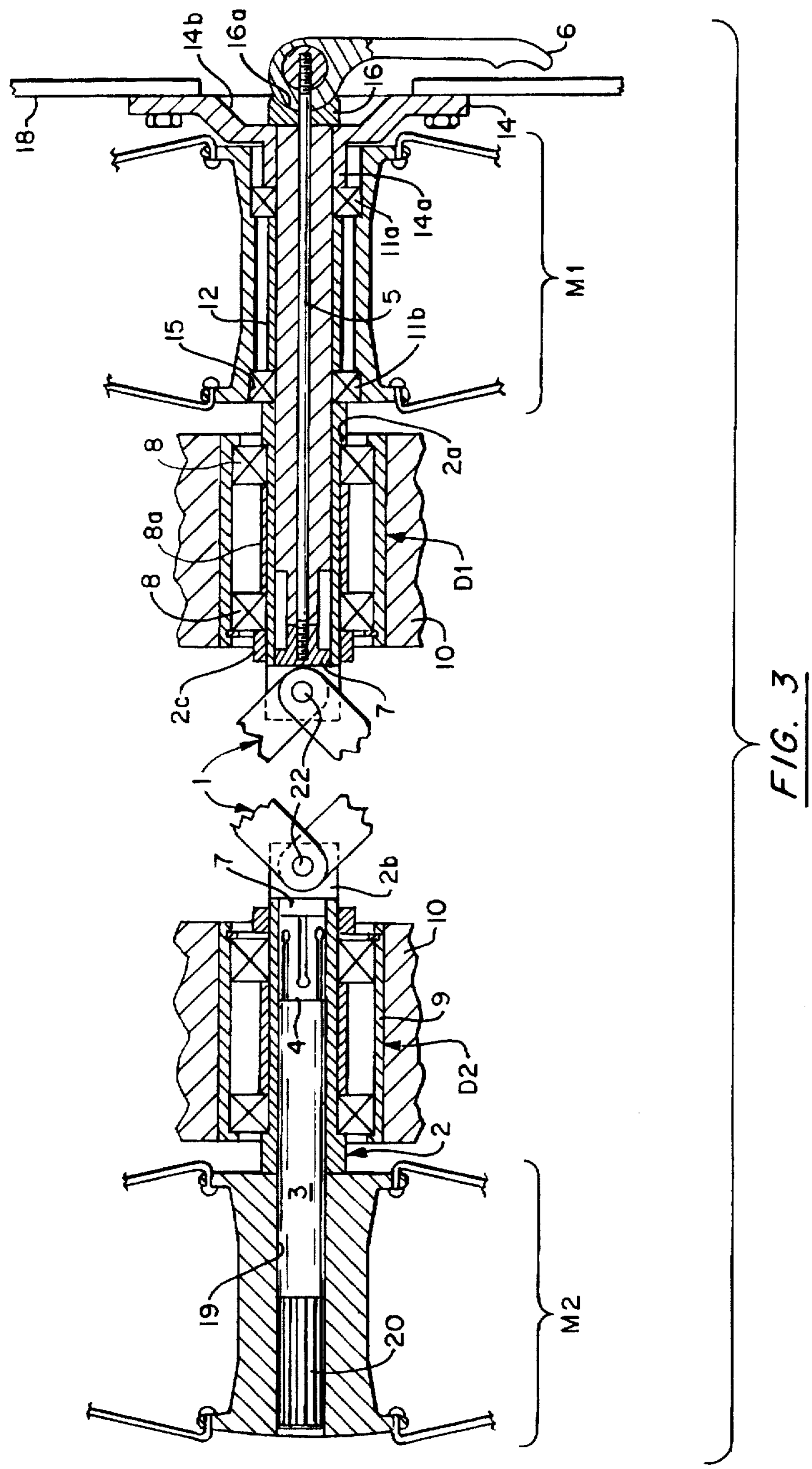
FIG. 3 is a cross-sectional view of the hub set, according to the invention, with one type of quick release axles (lever type) and one type of linkage (articulated bars) in a locked and linked set-up.
Figure 4:
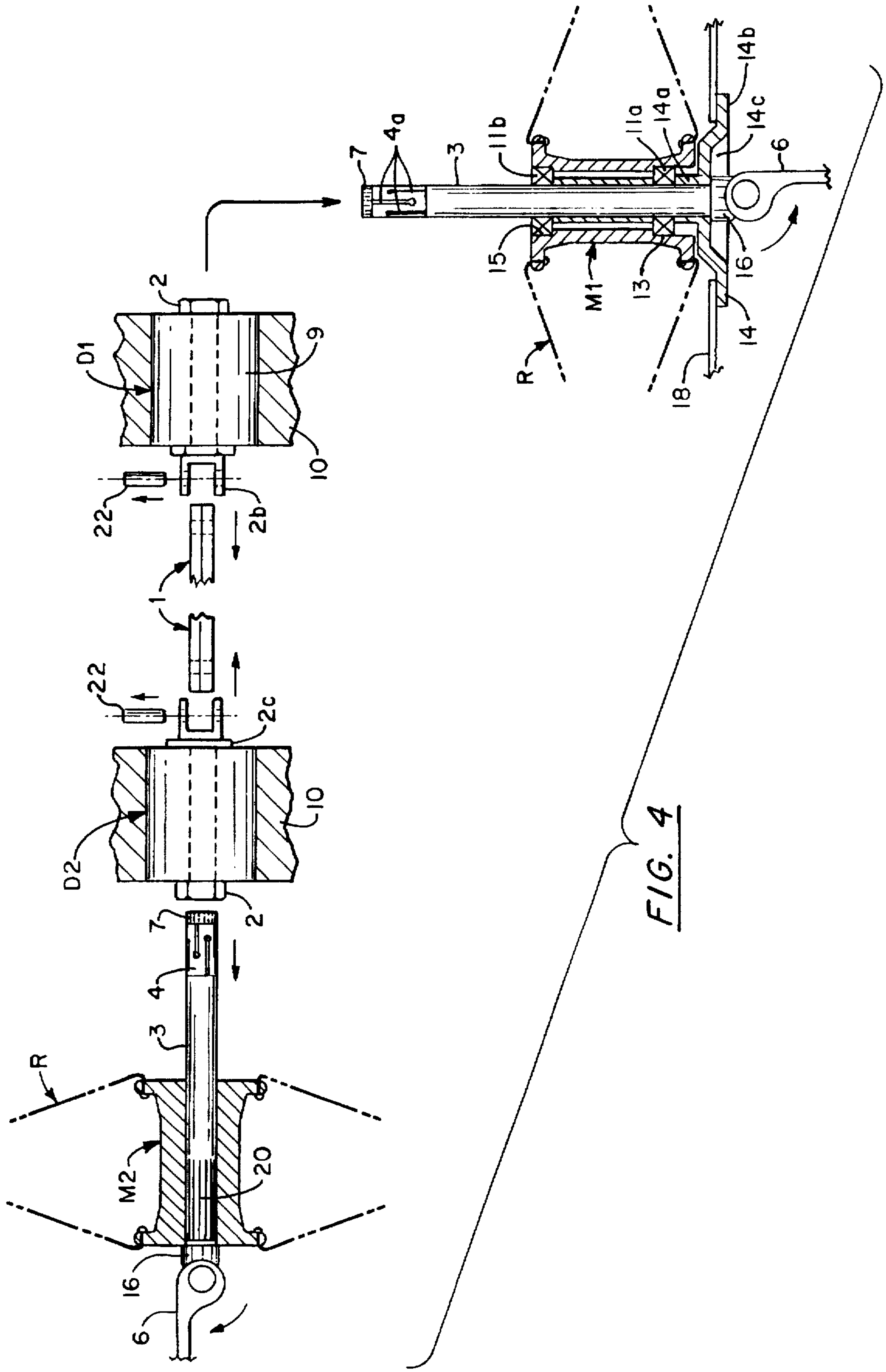
FIG. 4 is a cross-sectional view of the hub set, according to the invention, with one type of quick release axles (lever type) and one type of linkage (articulated bars) in unlocked and linked set up.

In order to describe more specifically the purpose of the invention a detailed explanation follows, but it is not limited by the drawings.

DETAILED DESCRIPTION OF THE INVENTION

The hub bodies associated with each wheel are designated as M1 and M2; they support the rims and spokes (R) of each wheel (R1) and (R2). These two hubs are manufactured with any appropriate known material. Each of these hubs (M1 & M2) receives an additional and identical insert (D1 & D2) located inwards from the hub body, out of which the linkage system is secured to ensure rotation on the driven side.

Each insert (D1 & D2) includes a hollow cylindrical body or receiver (2) of a predetermined length that rests against the inner side of the hub (M1 & M2). This receiver allows the positioning of a long axle (3) through first the hub (M1 & M2) and partially through the insert (D1 & D2), and having on its end a surface allowing the securing and positioning of a split collar (4) with one or more longitudinally inverted slits to permit a certain elastic deformation. A long pin (5) is fitted inside the axle (3) and is fastened to a pivotable lever (6) at the one end, as described further. At the other end, a threaded part (7), such as a nut, is fitted and adjusted so as to ensure a means of fastening the axle (3) in the receiver (2). The receiver has a long length which is sufficient to extend to beyond the position of the threaded part (7) at the end of the long pin (5) and has a bifurcated shape on one end to allow it to be secured to the linkage system (1). On this receiver, two rolling surfaces, or roller bearings (8) separated by a spacer (8*a*), are held in place on one side against a shoulder (2*a*) on the receiver and a threaded nut (2*c*) on the other. An insert sleeve (9) is placed over the aforementioned parts and allows the installation in a cylindrical support provided on the wheelchair frame (10). The two inserts (D1 & D2) are thus identical as shown in the drawings.

The hub (M1) is bored to allow the positioning of axle (3) supporting the pin (5) which is attached to the lever (6). Inside the hub, two roller bearings (11*a* & 11*b*) are positioned and separated by a spacer (12), one bearing (11*a*) being pressed inside the longer and large bore (13) on one side of the hub body and held in place by a contoured disk (14), which is the drive collar and which is used as a support for the inner hand rim (18). The other bearing (11*b*) is pressed inside the other shorter and large bore (15) on the other side of hub body and is held in place by the end of the receiver (2) of the insert (D1).

The drive collar (14) is established in the particular shape of a three-tiered hat with, on one side, a cylindrical portion (14*a*) to fit on the axle and in the drive collar with a spline or keyed, and extending outwardly in the shape of a bell (14*b*) with a hollowed shape allowing the positioning of a washer (16) providing a seat (16*a*) for the lever (6).

The drive collar is extended by a hand rim (18), while the other hand rim (23) is attached to the wheel (R1).

The other hub (M2) is much simpler in design by having an interior bore (19) with a key (20) or spline on the axle (3). The hub (M2) is fixed to and driven by the axle (3).

The operation of the apparatus is as follows:

After installation and fastening of the inserts (D1 & D2) on the frame of the wheelchair one proceeds with the installation of the linkage mechanism (1) made of bars forming adjustable parallelograms by securing its ends to the forks (2*b*) with appropriate fasteners (22). The assembly of the hubs (M1 & M2) with the axle (3) in the receiver (2) is simple and the rigid mounting of the insert is ensured by the locking of the pivotable lever (6).

The aim is to enable the person with an hemiplegic handicap to manoeuver only the hand rims (23 & 18) which are respectively associated with the wheel set-up (R1) and the drive collar (14). The permanent union allows the transmission of the rotation of the inserts thus the wheels (R1 & R2) by manual operation from one side by rotating the hand rims (18 & 23).

Furthermore, the reversible installation of the system is very easy to understand and to adapt according to the need of the handicapped person, whether it be a right/left or left/right position. The solution presented here is simple and leads to a standardization of the components used therefore reducing substantially the manufacturing costs compared with the system of prior art.

Although the description above contains many specificities, these should not be construed as limiting the scope of the invention but as merely providing illustrations of the presently preferred embodiments of this invention. For example the linkage mechanism between the two inserts can be an expandable, spring loaded double shaft thus providing the ability to remove the linkage when folding the wheelchair and to adjust the linkage for various wheelchair widths; an expandable shaft as mentioned above with two universal joints to also accommodate cambered wheels of wheelchairs; the axle quick release system with the pivotable lever can be substituted with a commonly used ball locking system, coupled with predetermined splines at the ends of the axles to insure transmission of rotation.

What is claimed is:

1. A set of wheel hubs in combination with a wheelchair, the set of hubs comprising:

- a first wheel hub on a first wheel of the wheelchair, said first wheel hub having an inner side;
- a first insert extending from the inner side of the first wheel hub;
- a second wheel hub on a second wheel of the wheelchair, said second hub having an inner side;
- a second insert extending from the inner side of the second wheel hub;
- an adjustable linkage system connected between the first and second inserts;
- a first hand rim disposed on a one side of the wheelchair for transmitting motion to drive the first wheel of the wheelchair; and
- a second hand rim disposed on the one side of the wheelchair transmitting motion through the adjustable linkage system to the second wheel hub, so as to transmit motion to drive the second wheel of the wheelchair, thus locating two independent controls of motion on the one side of the wheelchair.

2. A set of wheel hubs in combination with a wheelchair according to claim 1, wherein:

- each of said first and second inserts comprises an elongated hollow cylindrical receiver positioned against the inner side of the respective wheel hub, the receiver allowing insertion of an axle completely through the hub and partially through the insert, and having on one end a surface allowing positioning and centering of a split collar, the collar being elastically deformable;
- each hub further comprises a long pin fitted inside the axle and operatively associated with a maneuverable lever located on an outer side of the hub, an adjustable fastener positioned at the end of the pin inside the axle, and a sleeve secured to the wheelchair frame, each sleeve surrounding the respective insert, and further including bearings to permit rotation of the axle therewithin.

3. A set of wheel hubs in combination with a wheelchair according to claim 2, wherein:

- each receiver extends beyond the innermost portion of the adjustable fasteners, and is coupled to a bifurcated end of the linkage system.

4. A set of wheel hubs in combination with a wheelchair according to claim 2, wherein:

the first wheel hub is designed to permit passage of the axle and support for the pin associated with the maneuverable lever, the hubs further comprise bearings, and a spacer which allows installation and rotation of the axle therethrough, wherein at least a first bearing is positioned against a shoulder of an inner bore on one side of the hub, the first bearing being held in place by a disk acting as a drive collar, and a second bearing positioned against a shoulder of an inner bore on a second side of the hub; and the drive collar has a configuration having a shape fitting inside the hub and positioned with a key or spline on the axle and extending outwardly in a bell shape, thereby allowing installation of a ring used as a seat for the maneuverable lever.

5. A set of wheel hubs in combination with a wheelchair according to claim 2, wherein:

the second wheel hub has an inner bore which is keyed or splined on the axle, the second wheel hub being fixed to the axle and therefore can be driven by the second hand rim.

6. A set of wheel hubs in combination with a wheelchair according to claim 1, wherein:

the wheel hubs are each mounted by quick release axles to a frame of the wheelchair.

* * * * *